May 20, 1958
A. D. BRUNDAGE
2,835,353
POWER OPERATED EMERGENCY BRAKE
Filed March 23, 1954
4 Sheets-Sheet 2
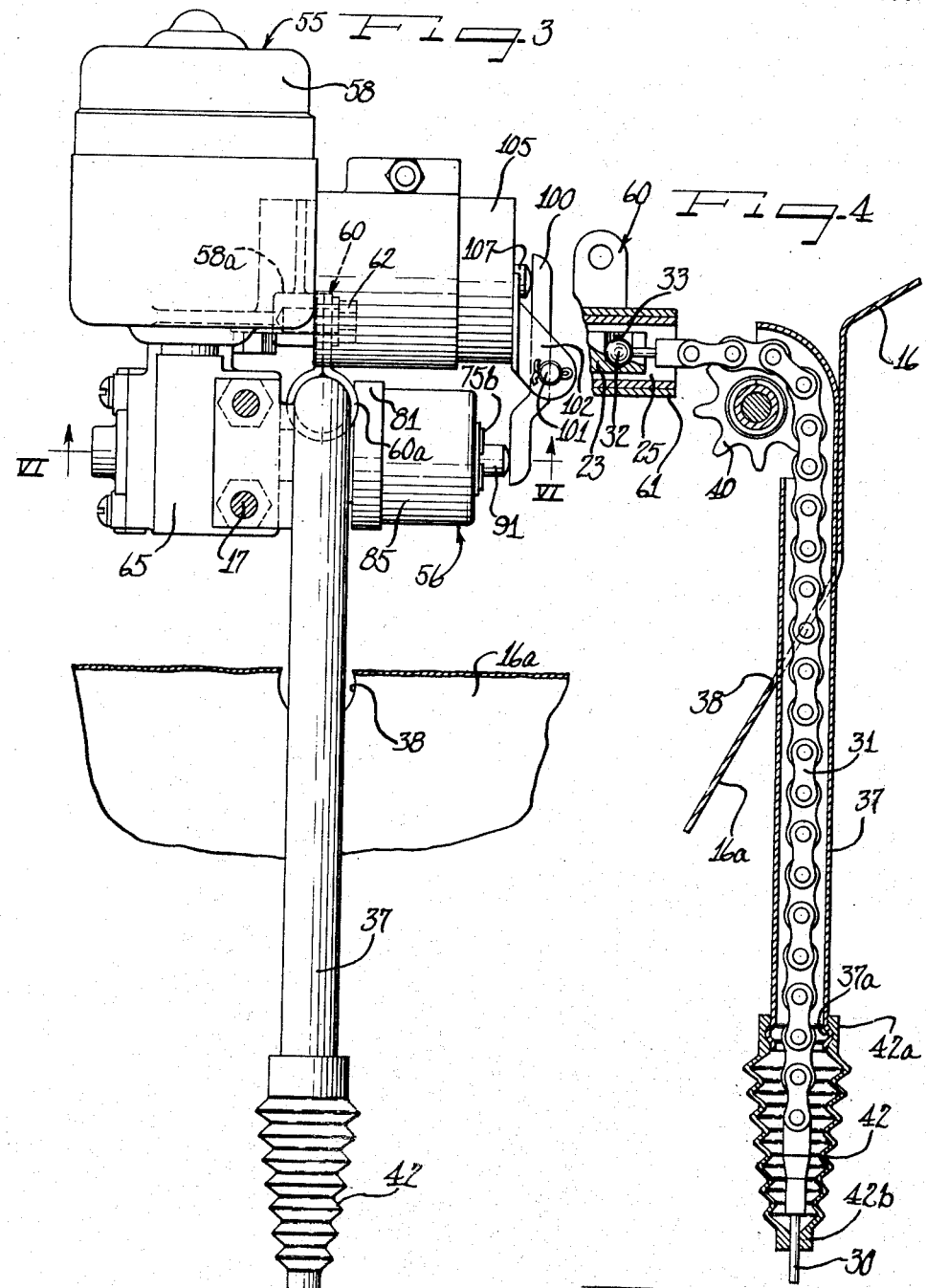
Inventor
Alan D. Brundage

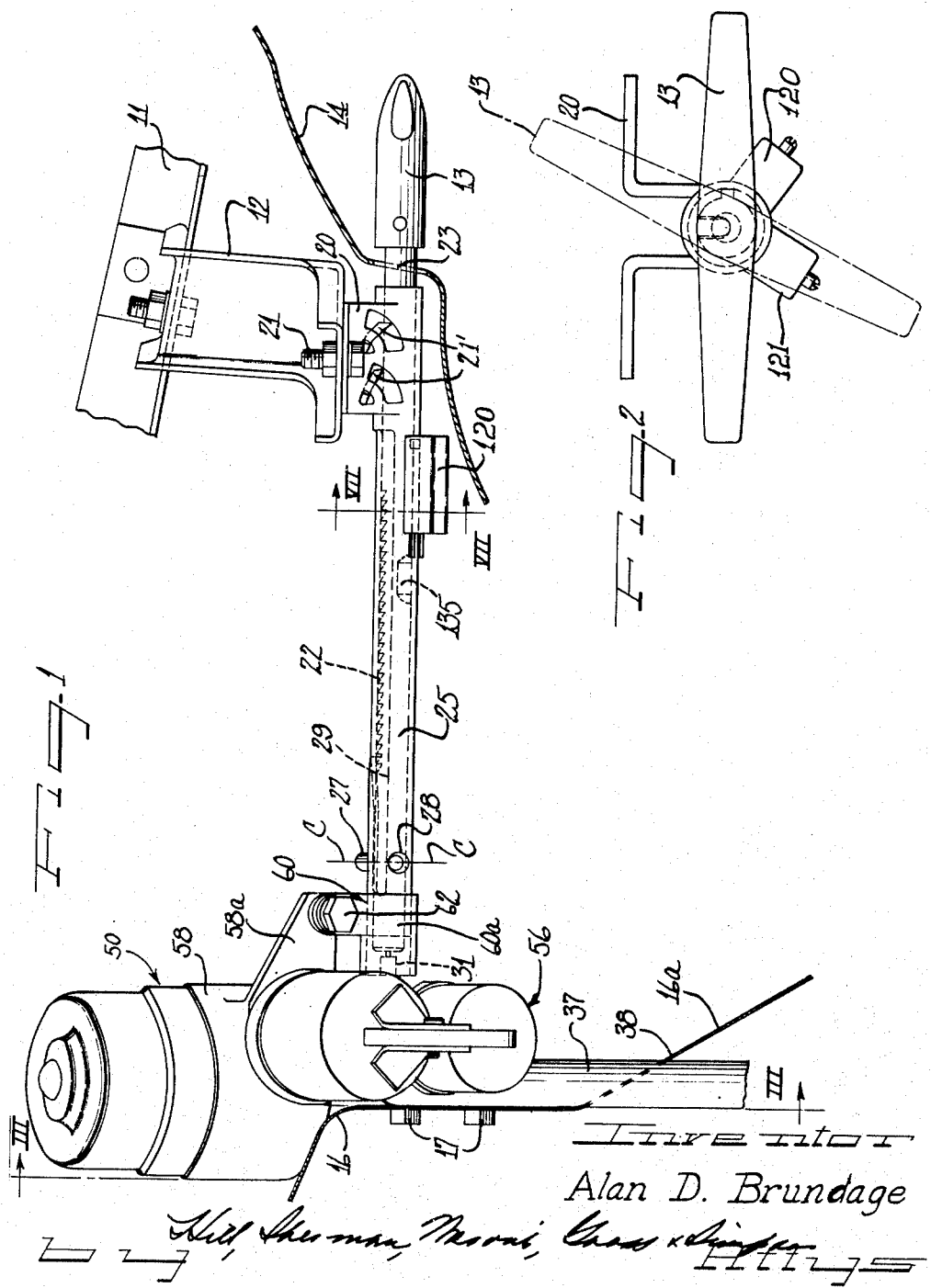

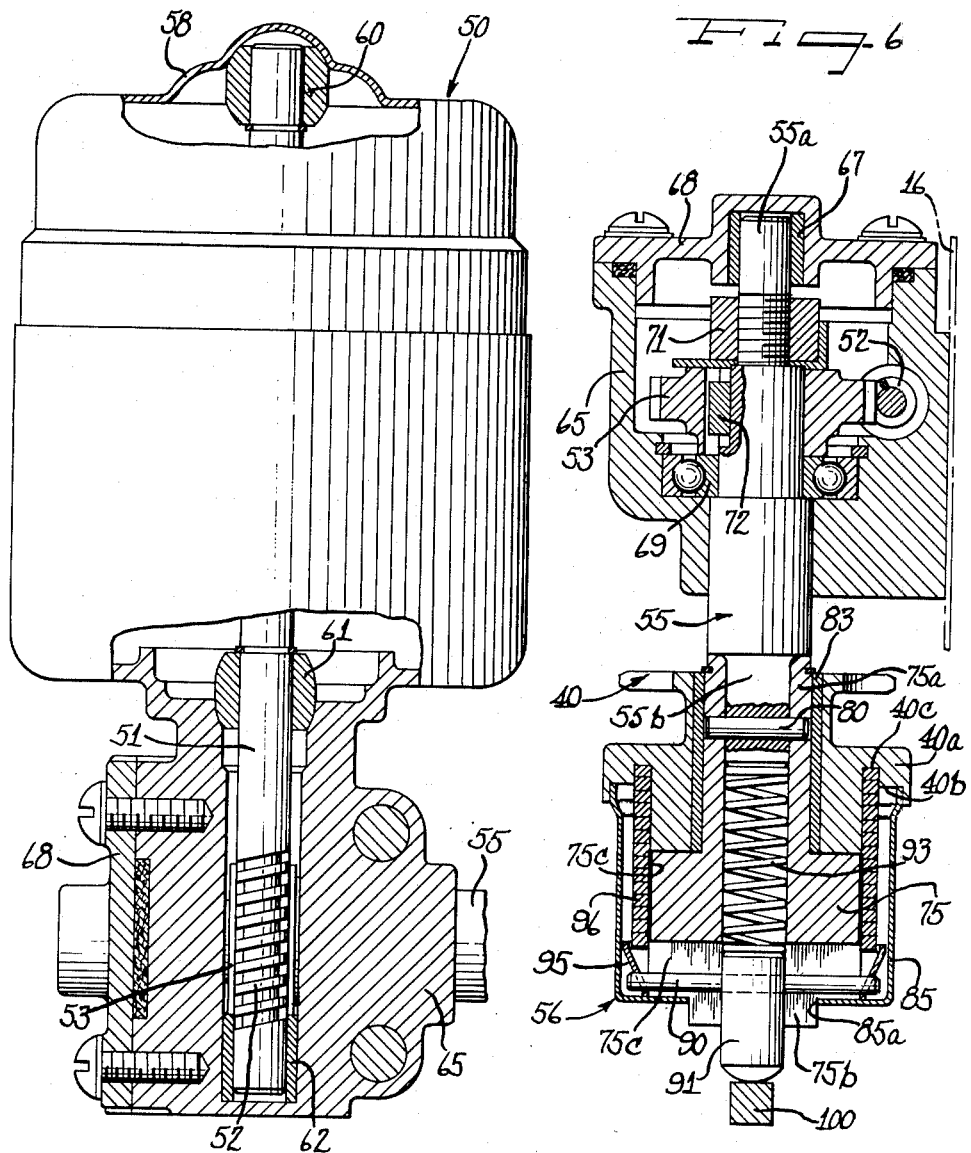

May 20, 1958  A. D. BRUNDAGE  2,835,353
POWER OPERATED EMERGENCY BRAKE
Filed March 23, 1954
4 Sheets-Sheet 4
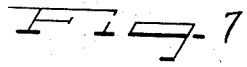
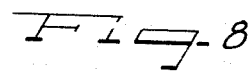
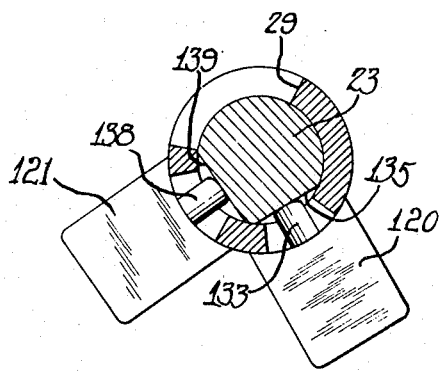
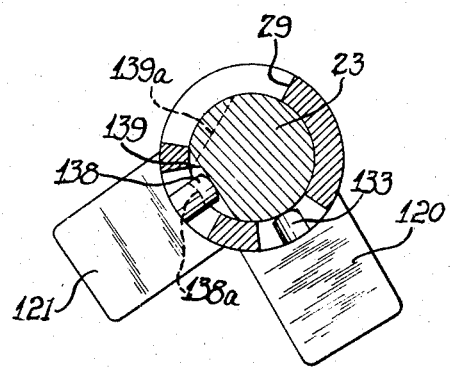
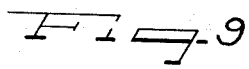
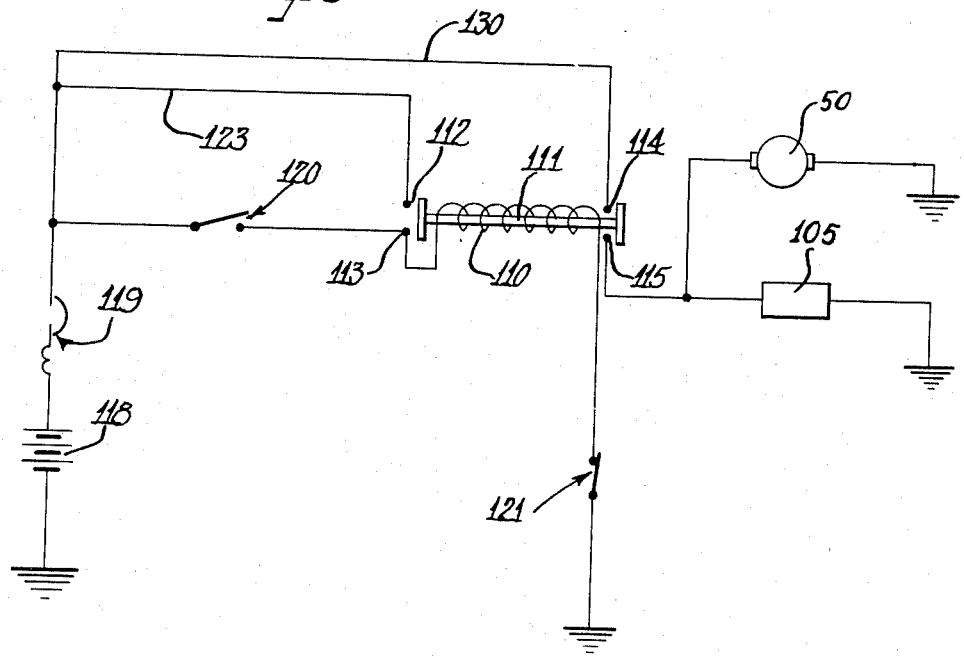
Inventor
Alan D. Brundage United States Patent Office 2,835,353
Patented May 20, 1958

2,835,353

POWER OPERATED EMERGENCY BRAKE

Alan D. Brundage, Birmingham, Mich., assignor, by mesne assignments, to The Bingham-Herbrand Corporation, a corporation of Ohio Application March 23, 1954, Serial No. 418,047

18 Claims. (Cl. 188—106)

This invention relates to a power operated emergency or parking brake and more particularly to such a brake controlled by a straight pull type brake actuating mechanism.

An object of the rpesent invention is to provide a power assisted emergency or parking brake for automotive vehicles and the like.

A further object of the present invention is to provide a novel power operated emergency or parking brake which is operated in a manner similar to present day straight pull brake lever assemblies.

Another object of the present invention is to provide an improved rugged and compact power operated emergency brake actuating system.

Still another object of the present invention is to provide novel power operated brake actuating mechanism which may be freely operated manually in case of power failure.

Yet another object of the present invention is to provide power operated brake lever actuating apparatus with novel means for interrupting brake setting action of the apparatus.

Another and further object of the present invention is to provide an electrical operated emergency brake actuating system having novel means for automatically de-energizing the system in response to setting of the brakes with a predetermined tension.

It is another and still further object of the present invention to provide a novel electrical control circuit for power operated emergency brakes.

Other objects, features and advantages of this invention will more fully appear from the following detailed description taken in connection with the accompanying drawings, in which:

Figure 1 is a fragmentary side elevational view of a power operated emergency brake system according to the present invention, assembled in an automobile with portions of the automobile interior in section;

Figure 2 is a somewhat diagrammatic end elevational view of the brake lever structure looking from the right or rear end thereof as in Fig. 1;

Figure 3 is a fragmentary end elevational view looking from the left or front end in Fig. 1 substantially on the line III—III.

Figure 4 is a fragmentary longitudinal sectional view illustrating the means by which power is transmitted to the brake actuating cable;

Figure 5 is a fragmentary vertical sectional view taken along the center line of the driving motor and illustrating the motor drive shaft;

Figure 6 is a fragmentary horizontal sectional view taken substantially along the line VI—VI of Figure 3;

Figure 7 is a cross-sectional view taken as along the line VII—VII of Fig. 1, but with the brake actuating rod moved rearwardly a short distance to close the momentary start switch to begin power operation;

Figure 8 is a cross-sectional view similar to Fig. 7 but with the brake actuating rod in a still further retracted position and indicating in dash outline the manner in which the brake actuating rod is turned on its axis to actuate the stop switch to release the brakes at any time during power setting of the brakes; and Figure 9 is a schematic wiring diagram illustrating an electric circuit for the power operated emergency brake system of Fig. 1.

Referring to Fig. 1, it will be observed that the power operated brake system of the present invention may be supported at its rear end from an automobile body frame member 11 by means of a bracket 12, with an operating handle 13 disposed at the rear or inner side of an instrument panel or the like 14. At its forward end, the system may be secured to a dash panel or fire wall 16 by means of bolts 17, Figs. 1 and 3. The system embodies features of a manually operated straight pull brake lever assembly and thus has a U-shaped pawl housing 20 secured by means such as bolts 21 to the rear mounting bracket 12, the pawl housing 20 having spring urged pawls 21' cooperating with ratchet teeth 22 of an actuating rod or brake control member 23 slidably and rotatably mounted in a tubular housing 25 integral with and extending forwardly from the pawl bracket 20.

The actuating rod 23 has a restoring pin 27 affixed to the forward end portion, an access aperture 28 in the housing 25 enabling fastening of the pin to the rod 23 by inserting the pin through the aperture 28 on an axis indicated by the broken line C—C. The pin in cooperation with a guide slot 29, Figure 7, serves to limit relative rotary movement between the housing 25 and the rod 23 and serves to restore the rod to the orientation illustrated in Fig. 1 during movement of the rod to brake release position. When the handle 13, on the rear end of the rod is moved to the position indicated in dot dash outline in Fig. 2, the ratchet teeth 22 clear the pawls 21' to accommodate forward movement of the actuating rod 23. As the actuating rod 23 is pulled, through the handle 13, straight rearwardly in the orientation shown in solid outline in Fig. 1, the pawls 21' cooperate with the ratchet teeth 22 to hold the rod in the attained position to hold the brakes set.

As best seen in Fig. 4, the actuating rod 23 is connected with a brake setting cable 30 by means of a sprocket chain 31 having an anchoring ball 32 in a radial socket 33 at the forward end portion of the actuating rod. The sprocket chain 31 extends within a guard casing 37 and extends through an aperture 38 in a rearwardly lower sloping portion 16a of the firewall.

For power operation of the system a sprocket wheel 40 is provided for driving the sprocket chain 31 to apply tension to the brake actuating cable 30. An extensible and contractable tubular dust shield 42 is carried at the lower end of the casing 37 and has an upper sealing and connecting portion 42a on an annular rib 37a of the casing and a lower sealing and connecting member 42b in close fitting relation to the brake actuating cable 30.

For furnishing the motive power for the sprocket wheel 40 in the power application of the brake, a motor 50 is mounted in generally upright relation adjacent the forward end of the system and is in driving connection with the sprocket wheel 40 through a motor shaft 51 (Fig. 5), a worm 52, a worm wheel 53 (Fig. 6), a generally horizontal shaft 55, and a clutch assembly 56. The motor casing 58 is illustrated as having an integral ear 58a (Fig. 1) to which is secured a bracket 60 having a ring shaped portion 60a supporting the forward end of the housing 25, the bracket 60 being secured to the ear 58a by means of a bolt 62. The motor shaft 51 is journaled in spaced bearings 60, 61 and 62, while the shaft 55 is journaled in the gear housing 65 depending from the motor casing 58. The shaft 55 (Fig. 6) has a reduced end portion 55a journaled in a bearing 67 in an end cap 68 of the gear mounting 65, and has an intermediate bearing 69 adjacent the worm wheel 53. The worm wheel 53 is secured on the shaft 55 by means of a nut 71 and is secured for rotation with the shaft by means of a key 72.

The clutch assembly 56 has an inner member 75 having a coupling portion 75a receiving a reduced end 55b of the horizontal shaft therein, the shaft 55 being keyed to the inner drive member 75 by means of a pin 80. The sprocket wheel 40 has a hub portion 40a relatively rotatably mounted on the coupling portion 75a by means of a bearing sleeve 83, which is press fitted into the hub 40a of the spur gear. The hub 40a is recessed at 40b (Fig. 6) to receive a clutch cover member 85 which cover receives a reduced end portion 75b of the inner clutch member 75 by means of an aperture 85a in the front wall of the cover.

The end portion of the inner clutch member 75 is slotted as indicated at 75c to accommodate a pin 90 which is secured to a clutch operating button 91. Spring means 93 is carried at the interior of the clutch member 75 for urging the operating button 91 outwardly. The button 91 is reciprocably mounted within the clutch member 75. A generally frusto-conical or dished clutch operating collar 95 is secured to the outer extremities of the pin 90 and is axially movable for wedging a clutch spring 96 into engagement with a knurled surface 75c of the inner clutch member 75. The clutch spring 96 is secured in the recess 40c of the sprocket hub for driving the sprocket 40. Thus, when the clutch button 91 is depressed the operating collar 95 is moved rearwardly in the clutch casing 85 to wedge the forward end of the spring 96 against the knurled surface 75c to establish driving engagement between the clutch inner member 75 and the sprocket hub 40a to drive the sprocket wheel 40.

For depressing the button 91 to engage the clutch, a clutch operating lever 100 is pivotally mounted at 101 between a pair of ears 102 extending from a solenoid housing 105. The solenoid 105 has an armature 107 acting on the upper end of the lever arm 100 so that when the solenoid is energized and the armature 107 projected, the lower end of the lever arm 100 is operative to depress the clutch operating button 91 and engage the clutch.

In Fig. 9, a relay winding within the casing of solenoid 105 is diagrammatically illustrated at 110 as controlling an armature 111 and as closing contacts 112, 113 and 114, 115 upon energization of the relay. As illustrated in Fig. 9, the relay may be energized from a conventional automobile storage battery 118 through an overload switch 119, a momentary start switch 120 and a normally closed cut-off switch 121. Energization of the relay 110 causes closure of contacts 112, 113 to provide a holding circuit for the relay through conductor 123 and closure of contacts 114, 115 to energize the brake operating motor 50 and the clutch operating solenoid 105 from battery 118 through conductor 130, and contacts 114, 115.

For automatically de-energizing the motor 50 when the brake cable 30 has a predetermined tension applied thereto, the overload switch 119 is designed to open at a predetermined current which corresponds to the load on the motor for the desired brake tension, which may for example be 90 pounds. The engagement of the pawls 21' with the ratchet teeth 22 provides a positive locking retention means of the brake when the motor is de-energized. If at any time during power setting of the brakes it is desired to release the brakes, the cut-off switch 121 may be opened in a manner to be described to de-energize the relay 110 and thus to open the motor energizing circuit.

The momentary start switch 120, Figs. 1, 2, 7 and 8, is controlled by a pin 133 cooperating with a flat 135 (Figs. 1 and 7) disposed on the actuating rod 23 for registry with the pin 133 upon limited retraction of the rod. The stop switch 121 (Figs. 7 and 8) has an operating pin 138 cooperating with a flat 139 extending along the actuating rod 23 over the axial extent thereof traveling past pin 138 during normal brake setting movement of the rod.

When the actuating rod is in the position indicated in Fig. 7, the start switch operating button 133 is projected into the slot 135 to close the switch 120 of Fig. 9 and thus to energize the brake operating motor 50. It will be understood that this actuation of the switch 120 is accomplished by drawing back on the operating handle 13 until the flat 135 moves into registry with the operating button 133. As the operating handle 13 is drawn further back with the power assistance of the motor 50 through the sprocket wheel 40 in Fig. 4, the slot 135 travels past the button or pin 133 to move the pin 133 to the position indicated in Fig. 8, thus opening the switch 120.

The slot 139 controlling the stop button 138 extends over the entire extent of the actuating rod which travels past the button 138 so that at all times during normal brake setting operation, the stop switch 121 is in its normally closed position. However, if for any reason it is desired to interrupt the brake setting operation and release the brakes, the handle 13 need only be rotated to move the slot 139 to the position indicated in dash outline at 139a in Fig. 8 moving the pin 138 to the position indicated in dotted outline at 138a in Fig. 8. By this simple turn of the handle 13, which is the normal manner of releasing a manual brake lever of this type, the stop switch 121 is opened to de-energize the motor 50 and allow the brakes to be immediately released. The brake-release position of the handle 13 is indicated in dot dash outline in Fig. 2.

There is thus provided according to the present invention, a power operated brake system wherein the brake may be released even though brake setting power is being applied at the time. Further in case of a power failure, the brake is readily operated manually as the chain 21 provides a constantly engaged mechanical connection between the actuating rod 23 and the brake setting cable 30, and the same manipulations are required for applying the brake as in power operation. That is, manual operation of the brake requires a straight rearward pull of the operating handle 13 which is exactly the operation required to set in motion the power application of the brakes. Further, manual release of the brake requires a counterclockwise rotation of the handle 13 which is exactly the operation for cutting off the power during a power brake setting operation. The advantages of these features from a safety standpoint will be apparent.

It will be understood that modifications and variations may be effected without departing from the scope of the novel concepts of the present invention.

I claim as my invention:

1. In combination, a straight pull brake lever assembly for actuating the emergency or parking brakes of a vehicle, and electrically operable power means mechanically connected to said straight pull brake lever assembly for moving said assembly toward brake setting position and thereby assisting operation of said assembly, and means responsive to the tension transmitted to the brake lever assembly when the brakes are in set position for automatically de-energizing said power means.

2. In combination for use with emergency or parking brakes of a vehicle, a straight pull brake lever assembly including a straight pull actuating member connected with the brakes, an electrically energizable rotatable motor connected with said member and arranged to move said member in the direction of its length for applying a brake setting force thereto, and an electrical circuit controlling energization of said power means including switch means actuated by partial manual retraction of the member.

3. In combination for use with emergency or parking brakes of a vehicle, a brake lever assembly including a brake operating rod mounted for reciprocal and rotary movement and connected to the brakes, electrically motivated power means connected with said brakes for applying a brake setting force thereto, an electric circuit controlling initiation of brake setting action by said power means including switch means actuated by partial retraction of said rod, and switch means actuated by rotation of said rod to interrupt power setting of the brakes and allow release of said brakes, said rod being manually operable to set the brakes in case of a power failure.

4. In combination for use with emergency or parking brakes of a vehicle, a brake actuating assembly for connection to the brakes, electrically actuated power means for connection to the actuating means for applying a brake setting force thereto, and means for de-energizing said power means after the emergency brake is set to a predetermined tension.

5. In combination for use with brakes of a vehicle, power means for connection with said brakes for applying a brake setting force thereto, said power means including an electric motor and an energizing circuit therefor, and current responsive switch means in said motor energizing circuit operative to de-energize said motor upon a predetermined load being applied to said electric motor means.

6. In combination for use with brakes of a vehicle, brake actuating means for connection with said brakes, rotary driving means for applying a brake setting force to said actuating means, electric motor means for driving said rotary means, means for energizing said motor means, force responsive means for de-energizing said motor means when said brake actuating means is applying a predetermined tension to said brakes, and rigid mechanical retaining means for positively locking the brakes in set condition after deenergization of said motor means.

7. In combination for use with brakes of a vehicle, a brake actuating sprocket chain for connection to the brakes, sprocket means engaging said sprocket chain at a region intermediate its ends for applying a brake setting force thereto, and electric motor means for rotating said sprocket to apply a brake setting force to said sprocket chain.

8. In combination for use with brakes of a vehicle, a brake actuating sprocket chain for connection to the brakes, sprocket means engaging said sprocket chain at a region intermediate its ends for applying a brake setting force thereto, electric motor means for rotating said sprocket means to apply a brake setting force to said sprocket chain, and a manual actuator connected to said sprocket chain and operable to apply said brakes in case of a power failure.

9. In combination for use with brakes of a vehicle, brake actuating means for connection with said brakes, rotary driving means for applying a brake setting force to said actuating means, electric motor means for driving said rotary means, means for energizing said motor means, means for de-energizing said motor means when said brake actuating means is applying a predetermined tension to said brakes, clutch means interposed between said electric motor means and said rotary means, and solenoid means for actuating said clutch means.

10. In combination for use with brakes of a vehicle, brake actuating means for connection with said brakes, rotary drive means for applying a brake setting force to said actuating means, electric motor means for driving said rotary means, means for energizing said motor means, means for de-energizing said motor means when said brake actuating means is applying a predetermined tension to said brakes, clutch means interposed between said electric motor means and said rotary means, solenoid means for actuating said clutch means, relay means controlling energization of said motor means and said solenoid means, and switch means for actuating said relay means.

11. In combination for use with brakes of a vehicle, brake actuating means for connection with said brakes, rotary means for applying a brake setting force to said actuating means, electric motor means for driving said rotary means, means for energizing said motor means, clutch means interposed between said electric motor means and said rotary means, solenoid means for actuating said clutch means, relay means controlling energization of said motor means and said solenoid means, switch means for actuating said relay means, and overload means for deactuating said relay means at a predetermined load on said motor means to de-energize said motor means when the brakes are set to a predetermined tension.

12. In combination for use with brakes of a vehicle, brake actuating means for connection with said brakes, rotary means for applying a brake setting force to said actuating means, electric motor means for driving said rotary means, means for energizing said motor means, and means for de-energizing said motor means when said brake actuating means is applying a predetermined tension to said brakes, said motor de-energizing means comprising overload means responsive to the load on said motor means to interrupt the motor energizing circuit.

13. In combination for use with brakes of a vehicle, brake actuating means for connection with said brakes, rotary means for applying a brake setting force to said actuating means, electric motor means for driving said rotary means, means for energizing said motor means, means for de-energizing said motor means when said brake actuating means is applying a predetermined tension to said brakes, said actuating means including a straight pull rod mounted for reciprocation and rotation, and electric switch means controlled by movement of said rod for controlling energization of said motor means.

14. In combination for use with brakes of a vehicle, a sprocket chain connected to actuate the brakes, a sprocket wheel in driving connection with said sprocket chain, a straight pull brake lever assembly having a reciprocal and rotary brake actuating rod connected at its forward end with said sprocket chain, ratchet and pawl means for retaining said brake actuating rod in brake setting position, said ratchet and pawl means being releasable by rotation of said brake actuating rod, electric motor means for driving said sprocket wheel to apply a brake setting force to said sprocket chain as said brake actuating rod is retracted, and means for automatically de-energizing said motor means when said brake actuating rod has reached a predetermined brake setting position.

15. In combination for use with the brakes of a vehicle, mechanical brake actuating means for connection to the brakes of a vehicle including a reciprocal and rotary brake control member, retaining means for retaining said brake control member in incremental brake setting positions, said retaining means being releasable by rotation of said brake control member, electrical motor means operatively connected to said brake actuating means for driving said brake actuating means to set the brakes, means actuated by retraction of said brake control member to energize said electrical motor means, and means for automatically deenergizing said electrical motor means when said brakes are set, said retaining means thereafter automatically mechanically retaining said brakes in the set condition.

16. In combination for use with the brakes of a vehicle, mechanical brake actuating means for connection to the brakes of a vehicle including a reciprocal and rotary brake control member, retaining means for retaining said brake control member in incremental brake setting positions, said retaining means being releasable by rotation of said brake control member, electrical motor means operatively connected to said brake actuating means for driving said brake actuating means to set the brakes, means actuated by retraction of said brake control member to energize said electrical motor means, means for deenergizing said electrical motor means actuated by rotation of said brake control member, and means for automatically deenergizing said electrical motor means when said brakes are set, said retaining means thereafter automatically mechanically retaining said brakes in the set condition.

17. In combination with emergency or parking brakes of a vehicle, an electrically powered brake operating means connected with said emergency brake to apply a brake-setting force thereto, means responsive to the force of the brakes in set position for de-energizing said electrically powered brake operating means, and positively locking retention means providing a positive locking retention of the emergency brake in an attained set condition upon de-energization of the electrically powered operating means.

18. In combination with emergency or parking brakes of a vehicle, a manually operable brake actuating means connected with the brakes, an electrically powered brake operating means operatively associated with said actuating means to apply a brake-setting force thereto, means responsive to the force of the brakes in set position for de-energizing said electrically powered brake operating means, positively locking retention means providing a positive locking retention of the emergency brake in an attained set condition upon de-energization of the electrically powered operating means, and means providing a direct rigid constantly engaged connection between said manually operable brake actuating means and said brakes to positively retain the brakes in set condition upon de-energization of the electrically powered operating means.

References Cited in the file of this patent

UNITED STATES PATENTS

| | | | |
|---|---|---|---|
| Re. 11,945 | Green | | Nov. 19, 1901 |
| 420,693 | McElroy | | Feb. 4, 1890 |
| 1,134,771 | Sundh | | Apr. 6, 1915 |
| 1,300,094 | Adler | | Apr. 8, 1919 |
| 1,625,444 | Andress | | Apr. 19, 1927 |
| 1,761,939 | Short | | June 3, 1930 |
| 1,895,965 | Bendix | | Jan. 31, 1933 |
| 1,930,549 | Barbarou | | Oct. 17, 1933 |
| 2,052,201 | Logan | | Aug. 25, 1936 |
| 2,365,557 | Keith | | Dec. 19, 1944 |
| 2,608,881 | Sandberg | | Sept. 2, 1952 |
| 2,739,672 | Sandberg | | Mar. 27, 1956 |

FOREIGN PATENTS

| | | |
|---|---|---|
| 474,028 | Great Britain | Apr. 15, 1937 |